J. RAU.
PROCESS OF CHARGING MOLDS WITH GLASS.
APPLICATION FILED APR. 16, 1914.
1,205,018.
Patented Nov. 14, 1916.
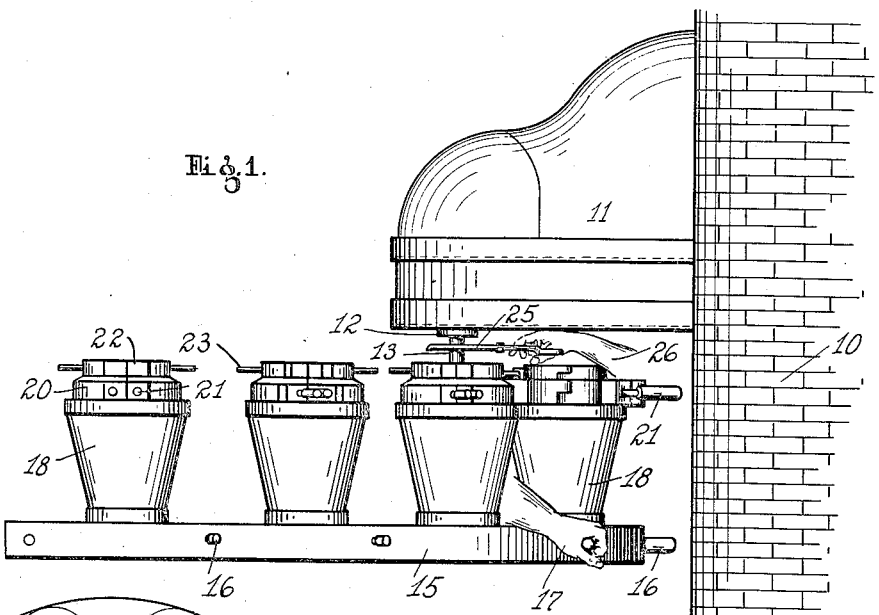
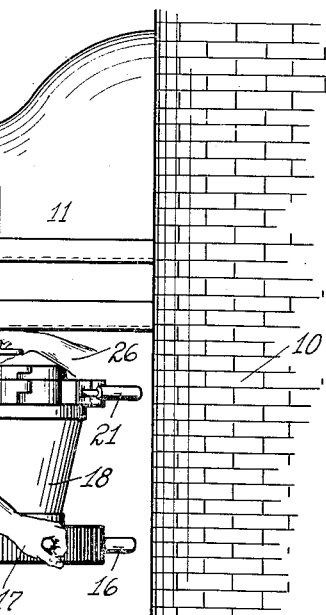
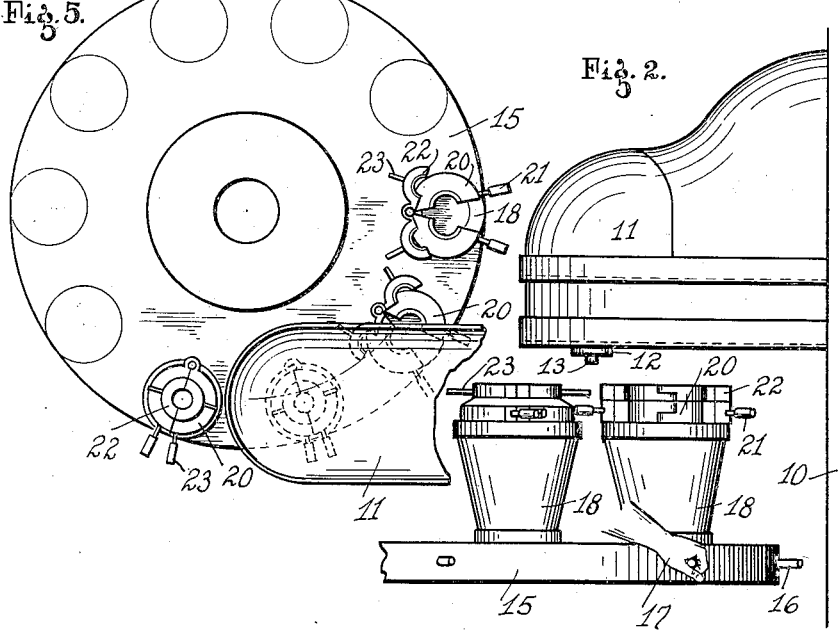
WITNESSES:
INVENTOR
John Rau
ATTORNEY

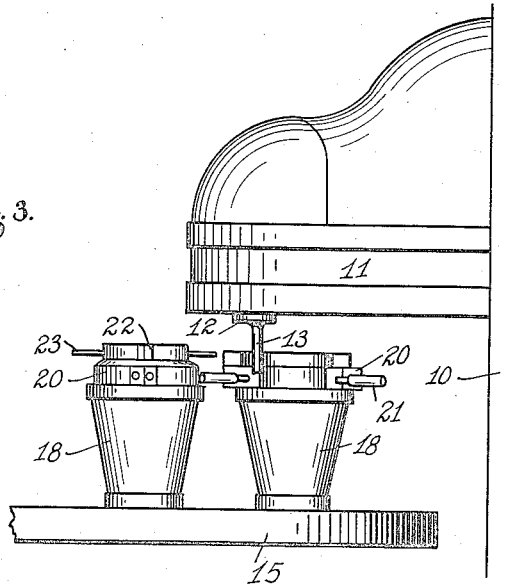
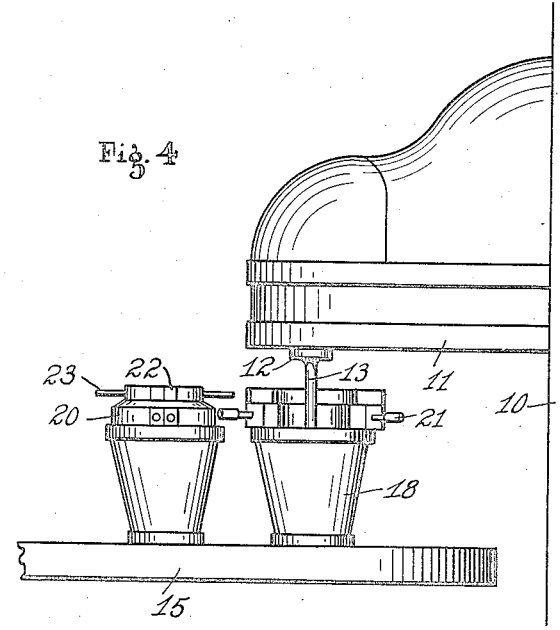

UNITED STATES PATENT OFFICE.

JOHN RAU, OF INDIANAPOLIS, INDIANA.

PROCESS OF CHARGING MOLDS WITH GLASS.

1,205,018.           Specification of Letters Patent.        Patented Nov. 14, 1916.

Application filed April 16, 1914. Serial No. 832,311.

*To all whom it may concern:*

Be it known that I, JOHN RAU, a citizen of the United States, and a resident of Indianapolis, county of Marion, and State of Indiana, have invented a certain new and useful Process of Charging Molds with Glass; and I do hereby declare that the following is a full, clear, and exact description thereof, reference being had to the accompanying drawings, in which like numerals refer to like parts.

The object of this invention is to cheapen and facilitate the feeding of glass to molds for making glassware.

The specific object is to feed glass in a continuous stream without any intermediate mechanism, excepting a knife or shears to sever the same, and without holding or supporting the stream of glass in the slightest degree at any time. When the stream of glass is temporarily supported or held, it enlarges at the lower end and enters the mold in such modified condition, that the bottom of the glass article is imperfect, as it has lines and blisters resulting from the lapping movement of the lower end of the stream of glass after it is severed and held or supported temporarily. With this invention the continuous stream of glass is never obstructed or supported, so it flows down perfectly straight and strikes the bottom of the mold straight and spreads in every direction equally and makes a smooth article and one without a defective bottom.

The object of the invention is accomplished by quickly severing the stream of glass, or severing it in such manner as not to stop it or support it to any degree, or to interfere with its straight downward flow, and to so situate the molds with relation to the outlet of the discharge spout from the glass tank, and to so arrange the molds with reference to each other on the movable mold table, that after the stream of glass is severed, the next mold can be easily moved into position below the stream of glass before it gets so low as to strike the side or top of the mold. Therefore, the glass is severed very close to the discharge spout, so that the portion of the stream of the glass above the shears will have a relatively long travel before reaching the mold. Another feature contributing to the accomplishment of this result when making narrow neck bottles, is the opening of one or more upper sections of the mold, so that the lower end of the stream of glass, as the mold approaches its position under the stream of glass, will pass in front of the opened section or sections of the mold, and through the front opening of said section or sections, into the lower or main section of the mold without striking the top of the side of the main section. In other words, if said upper section or sections were not opened, the stream of glass might strike them before the mold could be moved into position, but with said section or sections open, they are not in the way of the stream of glass, and a mold reaches its charging position before the stream of glass is low enough to strike the main mold. But this is unnecessary in making wide mouth bottles.

The nature of the invention will be understood from the accompanying drawings and the following description and claim:

In the drawings, Figure 1 is a side elevation of a portion of the glass tank, spout, mold table and molds, showing the position of parts at the time of cutting the glass. Fig. 2 shows a part of Fig. 1 immediately after the shears have been removed. Fig. 3 shows the same as the next mold is moving into position. Fig. 4 shows the same at the time the next mold first reaches its position. Fig. 5 is a plan view of a mold table and discharge spout, some of the molds being omitted and the discharge spout being partially broken away.

In detail, there is shown herein a glass tank 10 with a discharge spout 11, which has a bottom with an outlet 12. The glass flows freely from the tank into the discharge spout 11 and stands therein some distance from the bottom, so that a steady and normal stream 13 of glass can flow from the spout. It is immaterial how the spout is formed, so long as the stream flows with practical uniformity. There is a rotatable mold table 15 (the means for mounting the same not being shown) having radially extending handles 16, whereby the same can be moved intermittently by the hand 17 of the operator. It is immaterial by what means the table is moved, so long as it is moved intermittently and substantially as hereinafter explained.

Press molds are shown secured on the table 15 and consisting of a lower or main section 18. Upon said main mold section there is an intermediate mold section composed of two halves 20, similarly hinged together at the rear and having handles 21, and upon said intermediate mold section there is an upper mold section or liftover formed of two halves 22, similarly hinged together at the rear and having handles 23. It is immaterial in this invention whether there be two upper mold sections or one. The press molds actually used herein are like that shown in my prior application, Serial No. 747,359, filed Feb. 19, 1913. The liftover can be relatively thickened, if desired, for the object hereinafter stated.

There is shown in Fig. 1 an ordinary pair of hand shears 25 for severing the glass, operated by the hand 26 of the operator. The press molds are located as close together as they can be and yet permit them to be sufficiently opened. This is in order to reduce the extent of movement of the table or mold to bring the mold into charging position, although the same object can be attained by any suitable mechanical means for more quickly moving the mold table than by hand.

The process consists in maintaining a continuous flow of a stream of glass from the discharge spout, in quickly severing said stream of glass near the discharge spout outlet without stopping, supporting or laterally moving the same, and then moving the next press mold into position to receive the severed end of the stream of glass before it has descended sufficiently far to strike against the outside or top of the press mold. As an additional step in the process, which is preferred in making narrow neck bottles, the upper portion of the press mold is opened before the operator begins to move it to the glass charging position, so that the lower end of the stream of glass may enter the front opening of the upper portion of the press mold and have that much more distance to travel before entering the main part of the press mold.

When making wide mouth bottles, the last step in the process above mentioned is unnecessary. The severing of the stream of glass should preferably be done by shears or two blades simultaneously moving toward each other. This does not distort or move or interfere with the downward movement of the stream of glass. But the invention is not limited to the use of two movable knife blades, as there may be other glass cutting means adapted to quickly sever a stream of glass without moving or affecting it in any way beyond severing it.

This process avoids and renders needless the use of receiving cups or other charging means operating between the discharge spout and the blank mold and thereby prevents the retardation of the regular flow of glass from the discharge spout and also prevents any parts of the glass lapping or chilling before it enters the blank mold. The use of intermediate discharging means necessarily increases the distance for the glass to travel from the discharge spout to the bottom of the blank mold and that causes the glass to lap and make blisters and chill and thus make an imperfect product.

The invention claimed is:

The process of charging molds with glass, which process consists in maintaining a constant stream of glass from a discharge spout to the molds, opening the upper portion of the mold before it reaches the mold charging position, severing the stream of glass near the discharge spout, and moving a mold into charging position so that the severed end of the stream of glass will pass between the separated upper portion of the mold and not strike the side or top of the unopened portion of the mold.

In witness whereof, I have hereunto affixed my signature in the presence of the witnesses herein named.

JOHN RAU.

Witnesses:
R. G. LOCKWOOD,
O. M. MCLAUGHLIN.